Jan. 20, 1931. E. F. JONES 1,789,819
PIPE INSULATION
Filed June 14, 1927
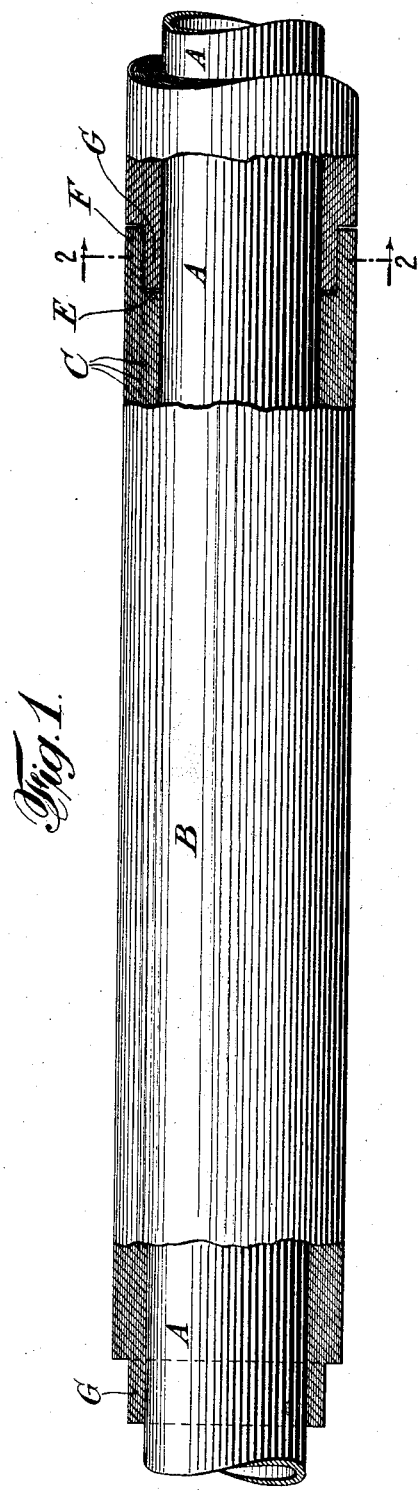
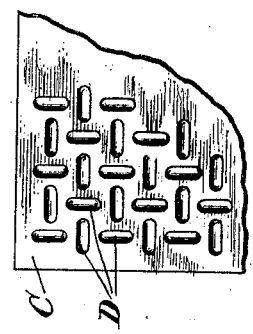
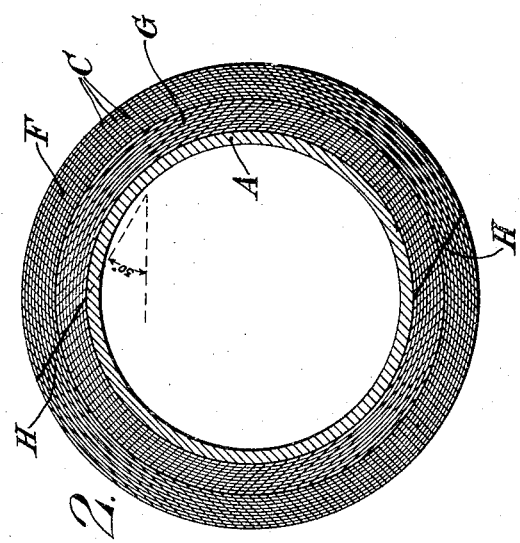
INVENTOR
Edward F. Jones
BY
ATTORNEY Patented Jan. 20, 1931

1,789,819

UNITED STATES PATENT OFFICE

EDWARD F. JONES, OF SAN FRANCISCO, CALIFORNIA, ASSIGNOR TO THE PHILIP CAREY MANUFACTURING COMPANY, A CORPORATION OF OHIO

PIPE INSULATION

Application filed June 14, 1927. Serial No. 198,830.

This invention relates to pipe insulation. It is adapted equally for use with either a laminated type of covering, a cellular type of covering or a molded type of covering.

The invention eliminates the open end joints between sections and provides for easy adjustment of the covering on the pipe so as to insure a snug fit to the pipe. By eliminating the open joint between sections, construction of adjacent sections will not, as in the open joint, result in exposing a portion of the pipe and expansion of either the pipe or insulation sections will in no way affect the insulation qualities, because expansion is taken care of by the improved end joints and the longitudinal joint, as will more readily appear by the drawings and the following description:

In drawings, Fig. 1 is a section of insulation embodying my invention. Fig. 2 is a cross section thereof; Fig. 3 shows a portion of a sheet of asbestos paper.

In the drawings, A is the pipe to be covered; B is the insulation material. This material may be of laminated structure, such as a plurality of plies of plain or indented asbestos paper held together in any suitable manner, or what is commonly called, air cell covering, which consists of a plurality of sheets of corrugated asbestos paper, either with or without plain sheets of like material, or, a molded covering, such as what is commonly termed 85 per cent magnesia, consisting of approximately 85 per cent magnesia and 15 per cent of asbestos fibres as a binder, or other suitable preformed coverings.

In the drawings I have shown my invention utilizing sheets of indented asbestos paper so that the indentations provide a raised portion on one side of the sheet and a corresponding sunken portion on the other side, or a convex portion on one side and a concave portion on the other. In Fig. 3 is shown a fragment of a sheet of paper of the character described, in which the paper C is provided with the indentations D. Plies of paper C having been rolled to form the covering of the desired size and thickness I provide either in the forming of the covering, or, after the covering has been formed, a bell F at one end the outer circumference of the bell being in line with the outer circumference of the pipe covering, and at the opposite end of the covering section I provide a reduced portion G, the inner circumference of which corresponds with the inner circumference of the pipe covering and the outer circumference of which is adapted to readily fit within the inner circumference of a bell F on the next adjacent section.

As will be seen in Fig. 1, this construction enables the adjacent pipe covering sections to be fitted together upon a pipe so as to form a joint between sections that permits of contraction and expansion of the sections without opening of the joint.

In the form of covering shown in the drawings, by reason of the paper being of a flexible nature, a single longitudinal joint H is provided as by reason of the flexibility of the covering it can be placed about the pipe, closed, and be secured in any suitable manner by placing bands around it or otherwise.

When a molded or other rigid type of covering is used, two joints, HH are formed as it is necessary to make such molded or rigid covering in two or more pieces.

Heretofore, it has been usual in the forming of molded covering or flexible covering to have the longitudinal joint so formed that it would be in line with a radius of the covering or pipe upon which the covering was placed; that is to say, if the line formed by the joint was continued it would intersect the longitudinal center of the covering. In my invention the joint is so formed that it is always at an angle to the radius of the covering as clearly shown in Fig. 2, where it is shown at an angle of 30° to a horizontal radius or at an angle of 60° to a vertical radius. Of course, the angle may be varied to one of various other degrees, except, that it must not be at an angle of 90° to any radius of the covering.

In the form of covering, shown in the drawings, that is, one made with asbestos paper, as stated above, only one longitudinal joint H will be necessary.

When such a covering has been placed about the pipe, if there is a slight difference between the inner-circumference of the covering and the outer circumference of the pipe, by reason of the joint H being at an angle other than 90° to any radius of the pipe or covering the over-wrapping portion of the covering B will slide on to adjacent portion and permit the covering to be brought into close contact with the pipe.

When molded or rigid coverings are used, formed in two or more pieces, two longitudinal joints HH preferably arranged so that they will be parallel to each other as shown in Fig. 2, each of which, however, will be at an angle other than 90° from any radius of the covering, the sections may likewise be made to conform to the size of the pipe if there is any slight difference by sliding one section upon the next adjacent section without in any way opening the joint or causing the covering to break or be damaged.

In the case of the flexible covering using the longitudinal joint, shown in Fig. 2, there is no danger of buckling, because in adjusting the covering on the pipe the angular longitudinal joint permits slippage of the material on adjacent sides of the joint in relation to each other; while in the ordinary joint forming a radius of the covering, the adjacent portions of the covering are brought into direct contact and there is no opportunity for slippage due to the fact that they are both exerting pressure in opposite directions on the same line.

It has been found that when the invention is used in covering formed with indented asbestos paper, that, by reason of the indentations on the circumference of the tongue groove and similar or corresponding indentations in the inner circumference of the bell F registering and more or less interlocking, the adjacent sections are not only held together but dead air cells are created which serve to increase the efficiency of the insulating material over what would result with the ordinary joint.

In the drawings and specifications, attempt has been made to point out some of the advantages resulting from this invention and the preferred structure embodying the invention has been shown.

When the coverings are in place on the pipe, they can, if desired, be wrapped or covered with a canvas covering or other suitable wrapping material before the bands are applied. This wrapping material can be applied to the covers in the factory and in the case of covering having two longitudinal joints as shown in Fig. 2 the wrapping may be cemented over the sections to form a hinge at one of the joints.

Of course, modification can be made without departing from the spirit of the invention.

Claims:

1. In a pipe covering semicylinder members, each provided with two longitudinal surfaces parallel to each other arranged at an angle oblique to the circumference of the covering so that when said members are assembled each cylinder is formed of two sections having a pair of longitudinal parallel joints at an angle oblique to the circumference of the covering.

2. In a pipe covering a plurality of arc shape members, each provided with two edges parallel to each other, adapted, when adjacent members are brought into contact, to form a longitudinal joint at an angle oblique to the covering and parallel to the corresponding joint formed on the opposite side of the covering.

In testimony whereof, I have signed my name to this specification.

E. F. JONES.